(12) United States Patent
Dunn

(10) Patent No.: US 6,384,812 B1
(45) Date of Patent: May 7, 2002

(54) KEYBOARD DECK

(76) Inventor: Kay Ann Guinn Dunn, 25 Hillside Dr., Greenville, SC (US) 29607

( * ) Notice: Subject to any disclaimer, the term of this patent is extended or adjusted under 35 U.S.C. 154(b) by 0 days.

(21) Appl. No.: 09/488,148

(22) Filed: Jan. 20, 2000

(51) Int. Cl.$^7$ .................................................. G09G 5/00
(52) U.S. Cl. ....................................... 345/168; 345/156
(58) Field of Search .................................. 345/168, 156

(56) References Cited

U.S. PATENT DOCUMENTS

| | | | |
|---|---|---|---|
| 5,413,294 A | 5/1995 | Greenquist | 248/127 |
| 5,593,128 A | 1/1997 | Odom et al. | 248/346.01 |
| 5,655,743 A | 8/1997 | Gillis | 248/346.01 |
| 5,667,320 A | 9/1997 | Ambrose et al. | 400/472 |
| 5,746,402 A | 5/1998 | Ambrose et al. | 248/118 |
| 5,746,403 A | 5/1998 | Ambrose et al | 248/118 |
| 5,755,410 A | 5/1998 | Ambrose et al. | 248/118 |
| 5,975,780 A | 11/1999 | Fukami | 400/691 |
| 6,262,716 B1 * | 7/2001 | Raasch | 345/168 |

* cited by examiner

*Primary Examiner*—Steven Saras
*Assistant Examiner*—William C. Spencer
(74) *Attorney, Agent, or Firm*—McNair Law Firm, P.A.; Henry S. Jaudon

(57) ABSTRACT

A keyboard for use with a computer which includes a housing and having an upper surface. Pivotally attached to the housing is a pointer pad which is positionable between a position which covers at least a section of the keys displayed on the upper surface of the housing and a second position in which all keys on the upper surface are all uncovered while the pointer pad is positioned adjacent to the housing. Each position provides a working surface for the pointer which is in the proximity of the keyboard.

9 Claims, 3 Drawing Sheets

KEYBOARD DECK

BACKGROUND OF THE INVENTION

The instant invention is directed to a keyboard for use with a computer which includes as an integral part a pointer pad which selectively may be positioned in a first position to cover a section of the keys displayed on the upper surface of the keyboard and a second position in which all keys are uncovered.

Pointer pads which are associated with the keyboard support tray are known as illustrated by U.S. Pat. Nos. 5,755,410 and 5,667,320 to Ambrose et al. Also, there are pointer pads which comprise an independent structure or unit which is designed to be positioned on the upper surface of the keyboard in a free standing position is illustrated by U.S. Pat. No. 5,413,294 to Greenquist. In each instance there is the problem of misplacing the pointer pad. Further, in the first mentioned arrangement it is the support furniture which is adapted with the pointer pad.

Accordingly, an object of the instant invention is to provide a keyboard which includes as an integral part a pointer pad.

Another object of the present invention is a keyboard which includes a selectively positionable pointer pad. A first position covering a section of the keys displayed on the upper surface of the keyboard and a second position which is remote from the keyboard upper surface, but connected with the keyboard.

Still another object of the invention is to provide fixed locations for the pointer pad relative to the keyboard.

Another object of the invention is to provide a cover for the keys of the numerical section.

SUMMARY OF THE INVENTION

The above objectives are accomplished according to the present invention by a computer keyboard which is positionable in a keyboard tray or on a desk top. The keyboard includes a housing which includes a front, a back, a bottom surface are a top surface and a pointer pad. The keys are displayed in sections over the top surface. The keys normally arranged in sections to include the conventional section, which resembles the keys of a typewriter, the numerical section and the control section. Keyboards with other key configurations may exist and are easily adaptable to include the pointer pad.

The pointer or mouse pad which is provided as and integral part of the keyboard. The pointer pad, which includes an upper and a lower pointer support surface and is preferably pivotally mounted with the back of the keyboard housing in a position aligned with the numerical key section. The hinged connection allows the pointer pad to be pivoted into a first position to extend over the upper surface of the keyboard and cover the keys of the numerical section. The pointer pad may also be pivoted to a second position in which it extends away from the upper surface of the keyboard but remains connected therewith. The pointer is positionable on the pointer pad in either the first or second positions.

The pointer pad is preferable formed of molded plastic with the hinge members being an integral part of one end thereof. The mating hinge members are preferably formed integral with the back wall of the keyboard housing in a position elevated above the plane of the keys.

A finger, which extends substantially perpendicular of and downwardly from the lower pointer pad surface is formed integral with the end of the pointer pad opposite to the hinged end. The finger is of a length sufficient to elevate the lower surface of the pointer pad above the keys of the keyboard when the pointer pad is positioned over the keys. The finger preferably rests on the upper surface of the keyboard forward of the keys, however, it could rest on the keyboard tray forward of the keyboard housing.

The pointer pad is preferable formed of clear molded plastic having an outer surface with sufficient friction and resilience to allow the pointer to function properly.

The pointer pad is sized depending on the dimensions of the keyboard and the numbers of key sections desired to be covered. Generally the dimensions are between 6 and 9 inches in length and between 3.5 and 4.5 inches in width. The finger is normally of a width equal to the pad surface and between 1.5 and 4 inches in height.

BRIEF DESCRIPTION OF THE DRAWINGS

The construction designed to carry out the invention will hereinafter be described, together with other features thereof.

The invention will be more readily understood from a reading of the following specification and by reference to the accompanying drawings forming a part thereof, wherein an example of the invention is shown and wherein.

DETAILED DESCRIPTION OF THE PREFERRED EMBODIMENT

Referring now in more detail to the drawings, the invention will now be described in more detail.

Figures 1, 1A:
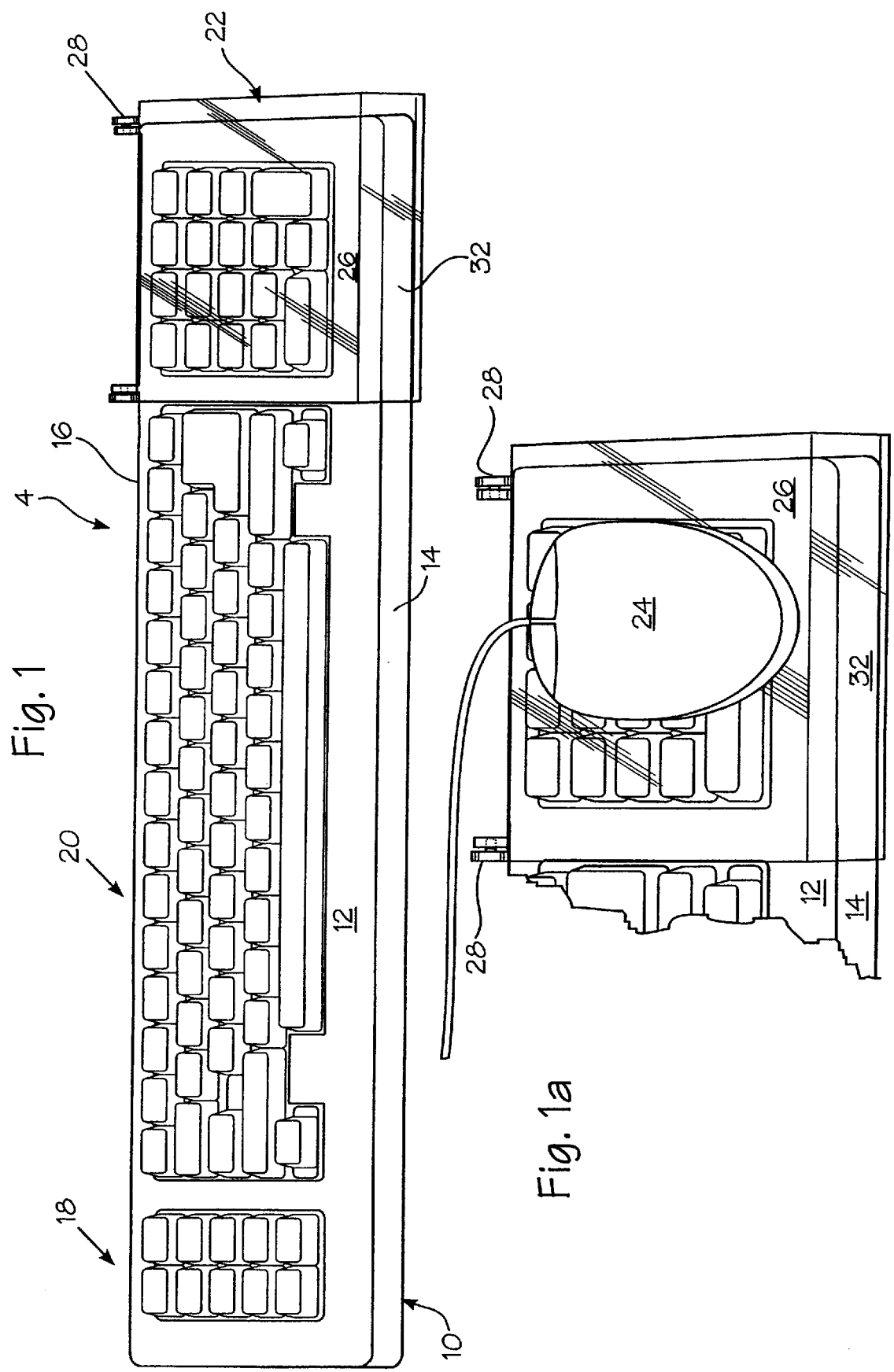
FIG. 1 is a perspective view of an exemplary keyboard and pointer pad of the invention.
FIG. 1a is an exploded sectional view of the keyboard, pointer pad of FIG. 1 with the pointer positioned on the pointer pad.

Turning to FIG. 1, a keyboard A having a housing 10 which consist of a bottom surface, a top surface 12, a pair of side surfaces 11 a front surface 14 and a back surface 16 is shown. A plurality of keys pass through and extend above the top surface in usual manner. The keys are divided into sections over the top surface. Normally these sections include the function section 18, the traditional section 20 and the numerical section 22. There may be more sections and they may be arranged in different locations, this does not alter the concept of the instant invention. pointer or mouse 24 is used in conjunction with the keyboard during operation.

Normally, the keyboard is positioned in a keyboard tray which it substantially fills. The mouse or pointer is usually placed on the surface of the desk carrying the keyboard try and is spaced from the keyboard. Also, on the desk top, the mouse tends to be covered with papers or just generally get in the way.

In many situations, it has been found that the keys of the numerical section are seldom if at all used. This is in part because the numbered keys also appear across the top row of keys of the conventional section. Accordingly, it has been found that an ideal location for a pointer pad is over the keys of the numerical section where the pointer reunites adjacent to the keys of the conventional and function sections.

To this end, pointer pad 26 is attached to back wall 16 by way of a pair of hinge members 28, 30. Hinge members 30 are preferably formed integrally with back wall 16 and extend upwardly a distance sufficient to elevate the lower surface of pointer pad 26 above the upper surface of the keys and top surface 12. Hinge members 28 are preferable formed integral with forward end 27 of pointer pad 26 and connect in usual manner with hinge members 30.

The opposite end of pointer pad 26 includes finger 32 which projects downwardly from the lower surface thereof. Finger 32 is located to be substantially perpendicular of the pointer pad upper and lower surfaces, although this can vary slightly as desired.

Finger 32 and pointer pad 26 are generally of equal width, however this is not necessary. The finger must be of a width sufficient to stabilize the pointer pad when in position over top12. Normally finger 32 will have a height just sufficient to elevate lower surfaces of the pointer pad above the keys. However, it may be desired to raise the forward portion of the pointer pad more than the rear portion thereof. Therefore, finger 32 may range between 1.25 to 4 inches in height. If desired, an adjustable plate could be attached to finger 32 so that the elevated height may be selected as desired.

Hinge members 28 and 30 may be individual separate members which are united with the housing and pointer pad. They may comprise a rotating hinge or a flex line over a flexible strip. They must however, be fixed with the pointer pad and the housing forming a unitary member.

Turning again to the drawings, FIG. 1 shows pointer pad 26 in its working or first position in which it has been rotated about hinges 28/30 to be positioned over the keys of numerical section 22. As shown, finger 32 is in engagement with the support tray and the lower surface of pointer pad 26 is vertically spaced above the keys. FIG. 1a shows pointer 24 in position and pointer pad 26 conveniently positioned adjacent from the keys of traditional section 20.

Figure 2:
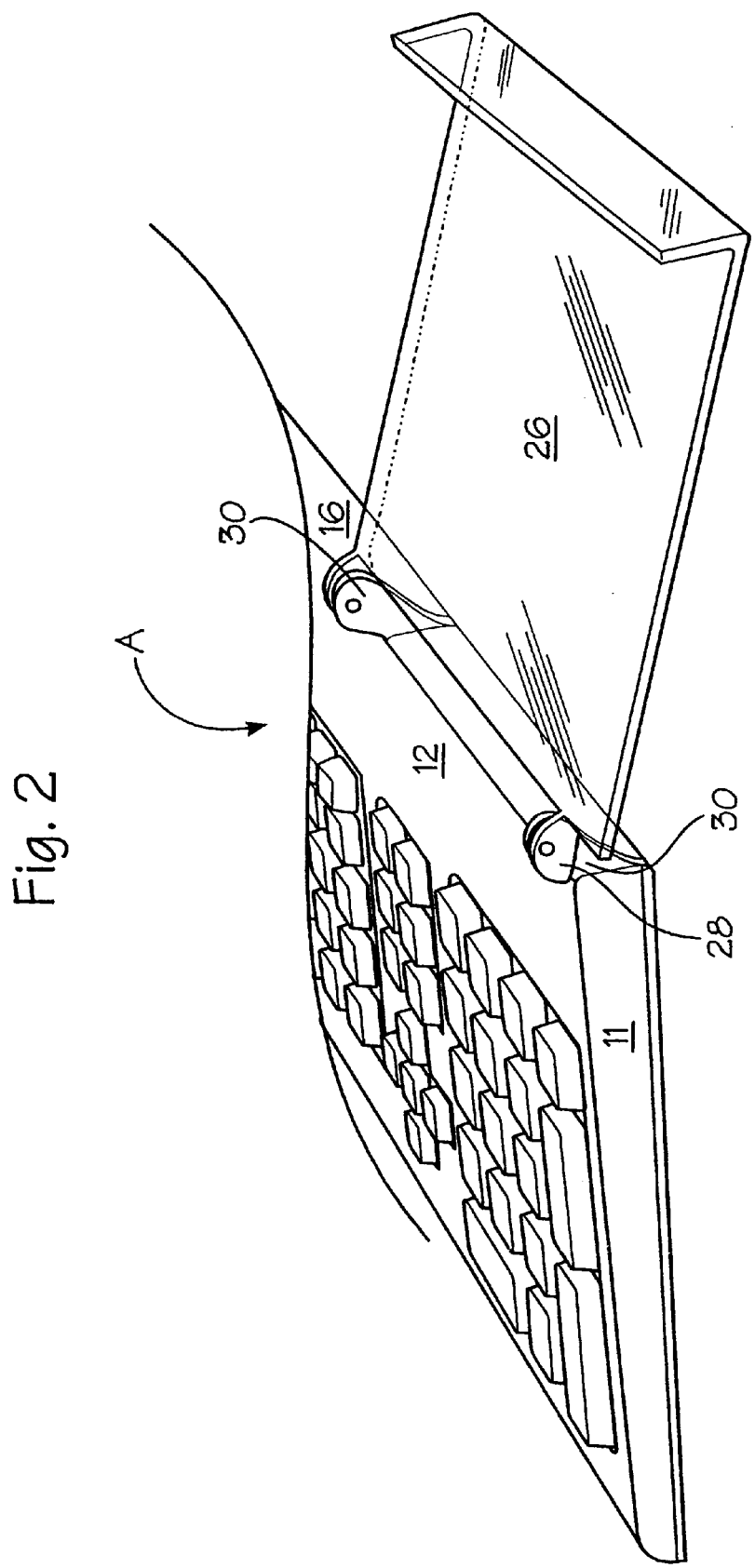
FIG. 2 is an exploded sectional view showing the keyboard with the pointer pad in its alternate position.
Figure 3:
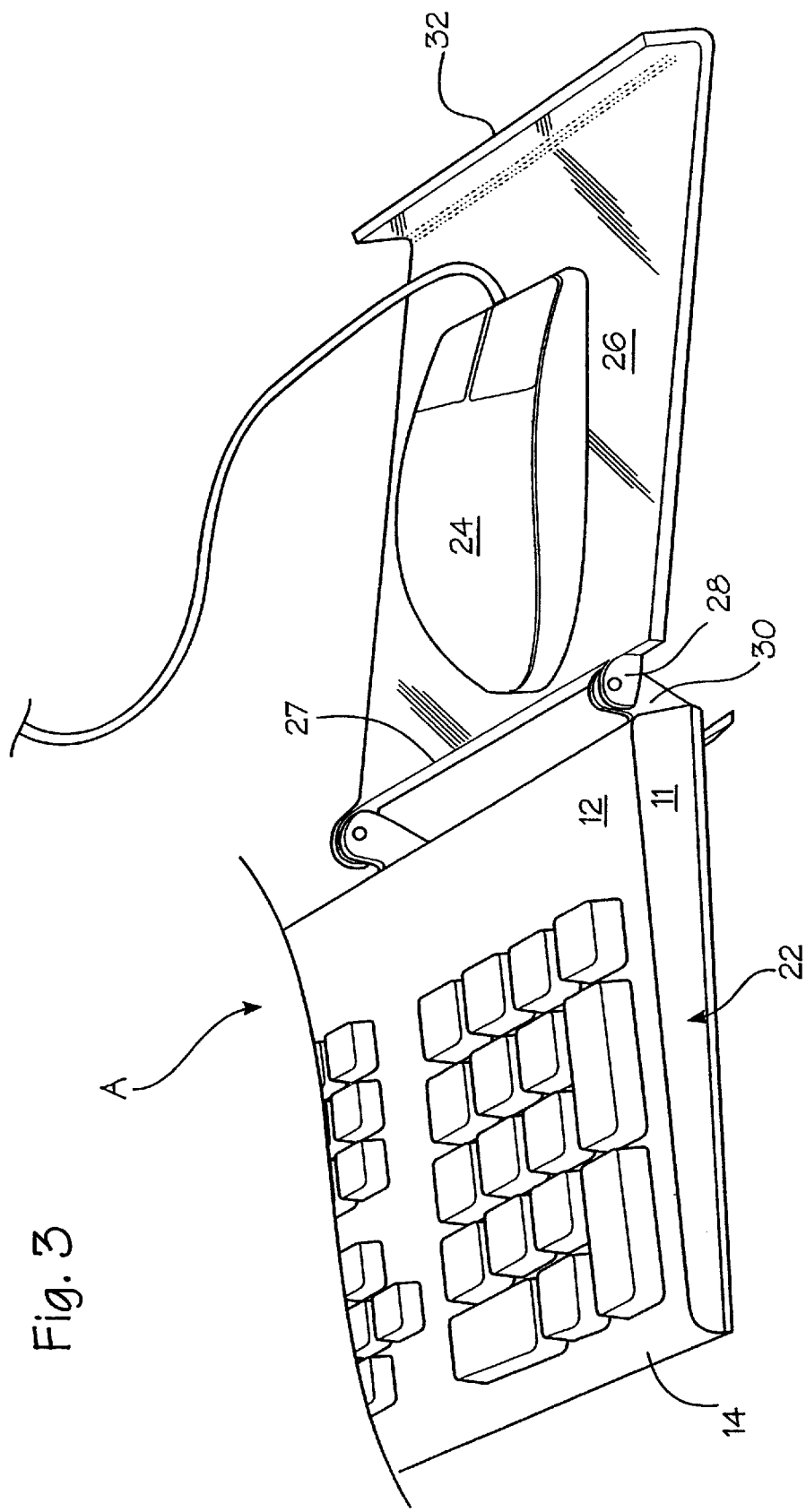
FIG. 3 is an exploded view similar to FIG. 2 showing the pointer positioned on the pointer pad.

FIG. 2 shows pointer pad 26 pivoted into its alternate or second working position with its lower surface exposed to receive pointer 24. Here its end opposite. pivots 28/30 rests on the tray while the working surface is maintained adjacent the keys of top 12. FIG. 3 shows the pointer 24 positioned on the lower working surface and adjacent the keys of the keyboard.

While a preferred embodiment of the invention has been described using specific terms, such description is for illustrative purposes only, and it is to be understood that changes and variations may be made without departing from the spirit or scope of the following claims.

What is claimed is:

1. A keyboard for use with a computer having a pointer comprising: a housing having a top surface, a bottom surface, a back wall, a front wall and a pointer pad, said top surface being vertically spaced from said bottom surface by said front and back walls; a plurality of keys extending through and substantially covering said top surface, said keys being divided into a plurality of sections including a traditional section and a numerical section;

a pointer pad for supporting said pointer being formed with a width substantially equal the width of at least one of said plurality of sections and having an upper pointer pad support surface and a lower pointer pad support surface;

pivot members connected with an end of said pointer pad and said back wall of said housing, said pivot members pivotally connecting said end of said pointer pad with said back wall of said housing; whereby said pointer pad may be moved into a first position in which at least the keys of one of said plurality of sections are covered and said upper pointer pad support surface is in position to support said pointer over a portion of said top surface and into a second position in which each of said key sections of said keyboard are uncovered and said lower pointer pad support surface is positioned to support said pointer in position adjacent said top surface.

2. The keyboard of claim 1 wherein said pivot members are molded integral with said pointer pad and said housing.

3. The keyboard of claim 1 wherein said pointer pad is formed of clear molded plastic.

4. The keyboard of claim 1 wherein said pointer pad is connected with said housing in position to cover said numerical section.

5. The keyboard of claim 1 wherein said pointer pad is between about 6 and 9 inches in length.

6. The keyboard of claim 1 wherein said pointer pad is between 3.5 and 4 inches in width.

7. A keyboard for use with a computer having a pointer comprising: a housing having a top surface, a bottom surface, a back wall, a front wall and a pointer pad, said top surface being vertically spaced from said bottom surface by said front and back walls; a plurality of keys extending through and substantially covering said top surface, said keys being divided into a plurality of sections including a traditional section and a numerical section;

a pointer pad being formed with a width substantially equal the width of at least one of said plurality of sections and a length slightly greater than the length of said keyboard, said pointer pad having an upper pointer pad support surface and a lower pointer pad support surface;

pivot members connected with a first end of said pointer pad and said housing, said pivot members pivotally connecting said end of said pointer pad above said top surface of said housing;

a finger connected with and extending substantially perpendicularly of a second end of said pointer pad to extend away from said lower pointer pad support surface; whereby said pointer pad may be moved into a first position above at least the keys of one of said plurality of key sections of said key board with said upper pointer pad support surface is in position to support said pointer over said at least keys of said one of said plurality of key sections and said pointer pad may be moved into a second position in with each of said key sections of said key board are uncovered and said pointer pad is secured with said key board adjacent one of said walls with said lower pointer pad support surface in position to support said pointer.

8. The keyboard of claim 7 wherein said finger is of a length to space said lower pointer pad support surface above said keys when said pointer pad is positioned in said first position.

9. The keyboard of claim 7 wherein said pivot members are molded integral with said housing and said back wall.

* * * * *